US006776430B2

(12) United States Patent
White et al.

(10) Patent No.: US 6,776,430 B2
(45) Date of Patent: Aug. 17, 2004

(54) STABILIZING SYSTEM FOR A RECLINABLE WHEELCHAIR

(75) Inventors: Gerald J. White, Hunlock Creek, PA (US); James P. Mulhern, Hunlock Creek, PA (US); Ronald J. Levi, Courtdale, PA (US)

(73) Assignee: Pride Mobility Products Corporation, Pittston, PA (US)

( * ) Notice: Subject to any disclaimer, the term of this patent is extended or adjusted under 35 U.S.C. 154(b) by 0 days.

(21) Appl. No.: 10/238,001

(22) Filed: Sep. 9, 2002

(65) Prior Publication Data

US 2004/0046358 A1 Mar. 11, 2004

(51) Int. Cl.$^{7}$ ................................................ B62M 1/14

(52) U.S. Cl. ............................... 280/304.1; 280/250.1; 280/755; 180/907; 297/310

(58) Field of Search ............................... 180/65.1, 907; 280/250.1, 304.1, 755; 297/310, DIG. 4

(56) References Cited

U.S. PATENT DOCUMENTS

| | | | | |
|---|---|---|---|---|
| 1,305,207 | A | 5/1919 | Foans | |
| 1,327,864 | A | 1/1920 | Everingham | |
| 3,580,591 | A | 5/1971 | Coffey | 280/5.32 |
| 3,848,883 | A | 11/1974 | Breacain | 280/5.32 |
| 3,905,437 | A | 9/1975 | Kaiho et al. | 180/15 |
| 4,310,167 | A | 1/1982 | McLaurin | 280/5.28 |
| 4,362,311 | A | 12/1982 | Bergman | 280/242 |
| 4,614,246 | A | 9/1986 | Masse et al. | 180/6.5 |
| 4,830,567 | A | 5/1989 | Rachman | 414/678 |
| 5,137,295 | A | 8/1992 | Peek | 280/304.1 |
| 5,294,141 | A | 3/1994 | Mentessi et al. | 280/250.1 |
| 5,320,412 | A | 6/1994 | Eakins et al. | 297/353 |
| 5,435,404 | A | 7/1995 | Garin, III | 180/6.5 |
| 5,564,512 | A | 10/1996 | Scheulderman | 180/65.5 |
| 5,575,348 | A | * 11/1996 | Goertzen et al. | 180/65.6 |
| 5,944,131 | A | 8/1999 | Schaffner et al. | 180/65.1 |
| 6,015,189 | A | 1/2000 | Broadhead et al. | 297/353 |
| 6,047,979 | A | 4/2000 | Kraft et al. | 280/250.1 |
| 6,062,600 | A | 5/2000 | Kamen et al. | 280/755 |
| 6,105,706 | A | 8/2000 | Cooper | 180/282 |
| 6,129,165 | A | 10/2000 | Schaffner et al. | 180/65.1 |
| 6,131,679 | A | * 10/2000 | Pulver et al. | 180/65.1 |
| 6,217,114 | B1 | 4/2001 | Degonda | 297/325 |
| 6,234,732 | B1 | 5/2001 | Trippensee et al. | 410/7 |
| 6,273,212 | B1 | 8/2001 | Husted et al. | 180/907 |
| 6,276,704 | B1 | 8/2001 | Suiter | 280/250.1 |
| 6,290,011 | B1 | 9/2001 | Langaker et al. | 180/65.1 |
| 6,357,793 | B1 | * 3/2002 | Dickie et al. | 280/755 |

OTHER PUBLICATIONS

Product literature entitled "QUANTUM™ Seating Options", by Quantum Rehab, a division of Pride Mobility Products Corp., 4 pages, admitted prior art.

* cited by examiner

*Primary Examiner*—Lesley D. Morris
*Assistant Examiner*—L. Lum
(74) *Attorney, Agent, or Firm*—Drinker Biddle & Reath LLP

(57) ABSTRACT

A stabilizing system for a reclinable wheelchair connects anti-tip members to the wheelchair seat such that pivoting of the seat causes pivoting of the anti-tip members. In one embodiment, the stabilizing system includes cables connected at opposite ends to the seat and to the anti-tip members. The cables may be connected to the seat bottom or, alternately, to the seat back. The anti-tip members may incorporate a pivoting suspension member that includes a drive motor for the wheelchair. Pivot control mechanisms connected to the cables can be used to permit a predetermined amount of seat pivot without corresponding pivot of the anti-tip members. The stabilizing system alternatively includes axially compressible link members connecting the seat back to the anti-tip members to provide controlled pivoting of the anti-tip members based on pivoting of the seat.

20 Claims, 8 Drawing Sheets

FIG. 6
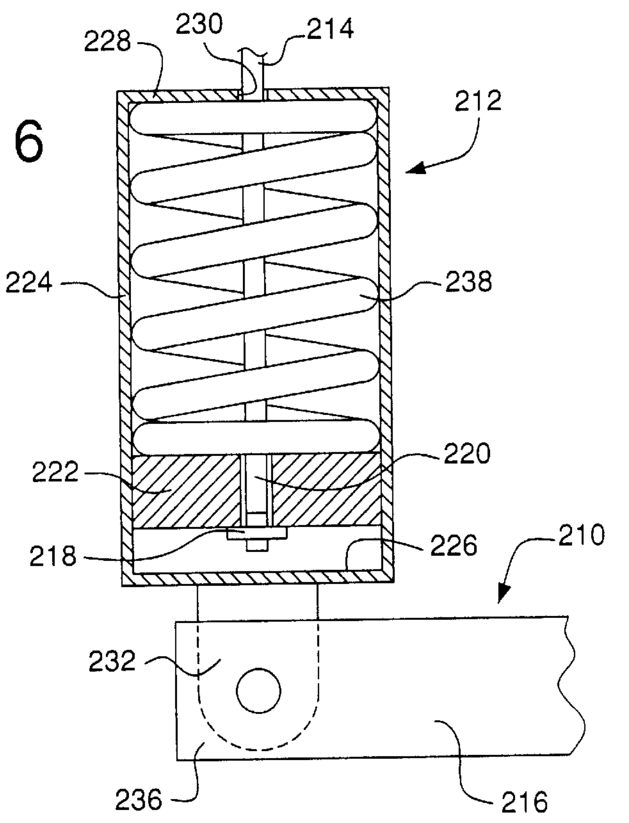
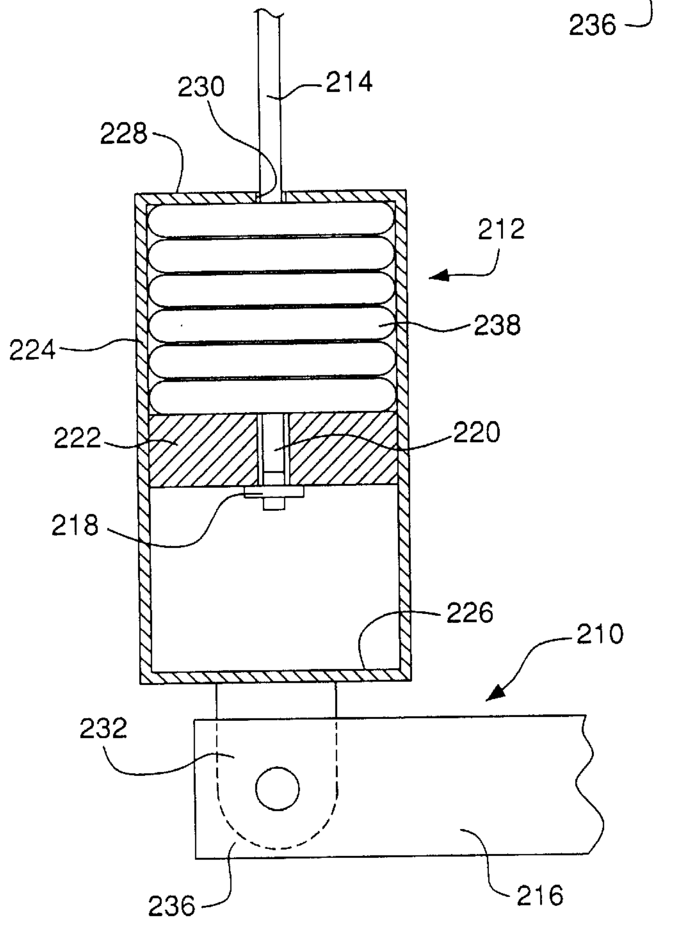
FIG. 7

STABILIZING SYSTEM FOR A RECLINABLE WHEELCHAIR

FIELD OF THE INVENTION

The present invention relates to a wheelchair having an anti-tip system for preventing overturn of the wheelchair. More particularly, the present invention relates to an anti-tip system for a reclining wheelchair in which the anti-tip members are connected to the pivoting seat.

BACKGROUND OF THE INVENTION

Wheelchairs, whether manually operated or motor driven, typically include a wheel-supported base and a seat having back and bottom portions supported on the base. Under conditions of sudden accelerations or decelerations, wheelchairs may be subjected to forces tending to overturn the wheelchair. It is known to provide wheelchairs having anti-tip members extending from the wheelchair to prevent overturn of the wheelchair. The anti-tip members are typically not ground engaging but, instead, are supported so as to contact the ground surface upon pivoting of the wheelchair in an overturn situation, thereby preventing complete overturn of the wheelchair. The anti-tip members typically include a wheel which provides for controlled contact between the ground surface while the overturning wheelchair is moving.

The anti-tip members may extend rearwardly from the base to limit rearward overturn that might occur, for example, if the wheelchair is accelerated to ascend an incline surface or to overcome an obstacle such as a curb. It is also known to include forwardly extending anti-tip wheels to prevent forward overturn of the wheelchair that might occur if the wheelchair were to be suddenly decelerated on a decline surface.

A problem associated with many anti-tip systems of the prior art is caused by the rigid connection between the anti-tip members and the wheelchair. Sudden stoppage of a rearwardly overturning wheelchair by contact of an unyielding anti-tip member and the ground surface may transfer jolting forces to an occupant potentially resulting in whiplash-type reactions.

Many invalid or handicapped persons are in their wheelchairs for extended periods of time. Lengthy confinement of a person in one position in a wheelchair, however, can lead to discomfort or even sores, resulting from a lack of circulation. It is, therefore, desirable to provide a reclinable wheelchair in which the seat of the wheelchair is pivotably supported on the base of the wheelchair. The pivoting of an occupant with respect to the base facilitates blood circulation thereby providing relief for the occupant.

Reclining of the wheelchair seat, however, shifts the center of gravity for the occupied wheelchair rearwardly. This shift in the center of gravity increases the tendency of the wheelchair towards rearward overturn (i.e., reduces the wheelchairs rearward pitching stability). A significant shift in the center of gravity may even result in a static load condition in which the force of gravity alone acting on the occupant is sufficient to overturn the wheelchair. Under such conditions it would be desirable for the wheels of the anti-tip member to be ground-engaging wheels (i.e., contacting the ground) such that pivoting of the wheelchair base with respect to the ground surface is completely prevented.

U.S. Pat. No. 5,137,295 to Peek discloses a rear anti-tip system having anti-tip members pivotably connected to the base of the wheelchair. Linkage members are pivotably connected to the anti-tip members and to the back of the seat to convert pivoting of the seat to pivoting of the anti-tip members. The linkage members, however, are rigid members. As discussed above, stoppage of an overturning wheelchair having such an unyielding linkage system will be sudden and jolting with respect to the occupant. Furthermore, the direct connection between the seat and anti-tip members by the linkage member means that the anti-tip members will be required to be pivoting with the seat throughout the entire range of pivot of the seat. Such pivoting of the anti-tip members may require that they have a raised position with respect to the ground surface that is excessively large for the anti-tip members to effectively prevent overturn of the wheelchair due to acceleration (i.e., acceleration overturn). To ensure that the raised anti-tip members in U.S. Pat. No. 5,137,295 can prevent acceleration overturn of the wheelchair it would be necessary to restrict the amount of pivoting of the seat to limit the required pivoting of the anti-tip members.

SUMMARY OF THE INVENTION

According to a first embodiment of the present invention, there is provided a stabilizing system for a wheelchair having a seat pivotably supported on a base. The stabilizing system includes at least one anti-tip member pivotably connected to the base at a pivot axis. The system may include a wheel rotatably connected to the anti-tip member adjacent one of its ends. The system further includes an anti-tip actuating cable operably connected to the seat and to the anti-tip member such that pivoting of the seat causes the cable to pivot the anti-tip member.

The wheelchair may include a lift assembly for pivoting the seat with respect to the base. The lift assembly includes at least one arm pivotably connected to a bottom portion of the seat and to the base. The actuating cable is secured to the arm of the lift assembly to provide for translation of the actuating cable as the seat is pivoted by the lift assembly.

According to a second embodiment of the invention, a powered wheelchair includes at least one drive motor engaging one of a pair of drive wheels. An anti-tip member is secured to the drive motor to form a suspension assembly. The suspension assembly is pivotably connected to the base at an axis such that the drive motor is located forwardly of the axis and at least a portion of the anti-tip member extends rearwardly from the axis. An actuating cable is connected at a first end to the suspension assembly forwardly of the axis. The cable is operably connected to a bottom portion of the wheelchair seat. The powered wheelchair preferably includes a recline assembly having at least one lift arm pivotably connected to the seat bottom and to the base with the cable being secured to the lift arm. The seat is preferably translatable with respect to the base for powered translation by a drive member.

According to a third embodiment of the invention, a stabilizing system is provided for a wheelchair. The system includes an anti-tip pivot control mechanism having an axially compressible spring. The control mechanism engages an actuating cable for a pivoting anti-tip member such that translation of the actuating cable results in compression of the spring. The compression of the spring provides a predetermined amount of seat pivot occurring without a corresponding pivot of the anti-tip member. Preferably the control mechanism includes a first member secured to the cable adjacent its first end and a second member secured to the anti-tip member with the spring being located between the first and second members such that translation of the cable results in compression of the spring.

According to a fourth embodiment of the invention, a reclinable wheelchair is provided which includes a pivoting anti-tip member that is upwardly biased by a spring. The wheelchair includes a linkage system connecting the seat to the anti-tip member to transfer pivot of the seat to pivot of the anti-tip member. The linkage system includes first and second members that are pivotably connected to one another. The second linkage member is axially compressible to provide for a predetermined amount of seat pivot without corresponding pivot of the anti-tip member. Preferably the second linkage member includes portions that are slidable with respect to each other and a spring engaging the portions of the second linkage member for biased extension of the member.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 6 is a side view, partly in section, of a pivot control mechanism of a wheelchair stabilizing system according to a third embodiment of the present invention;

FIG. 7 is a side view of the pivot control mechanism of FIG. 6, showing the actuating cable translated with respect to the mechanism;

DETAILED DESCRIPTION OF THE PREFERRED EMBODIMENTS

Figure 1:
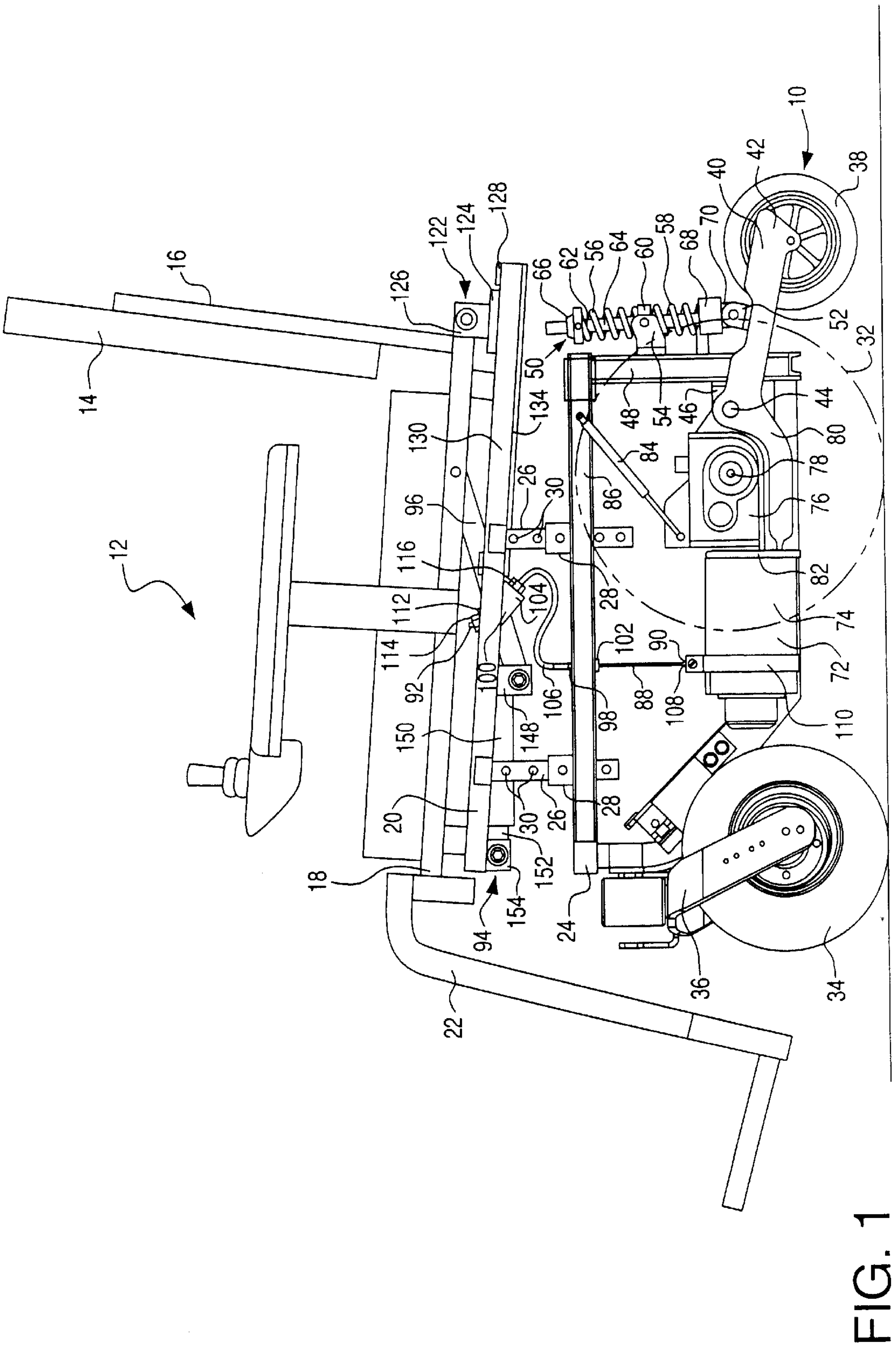
FIG. 1 is a left side view of a reclinable wheelchair incorporating a stabilizing system according to the present invention.
Figure 2:
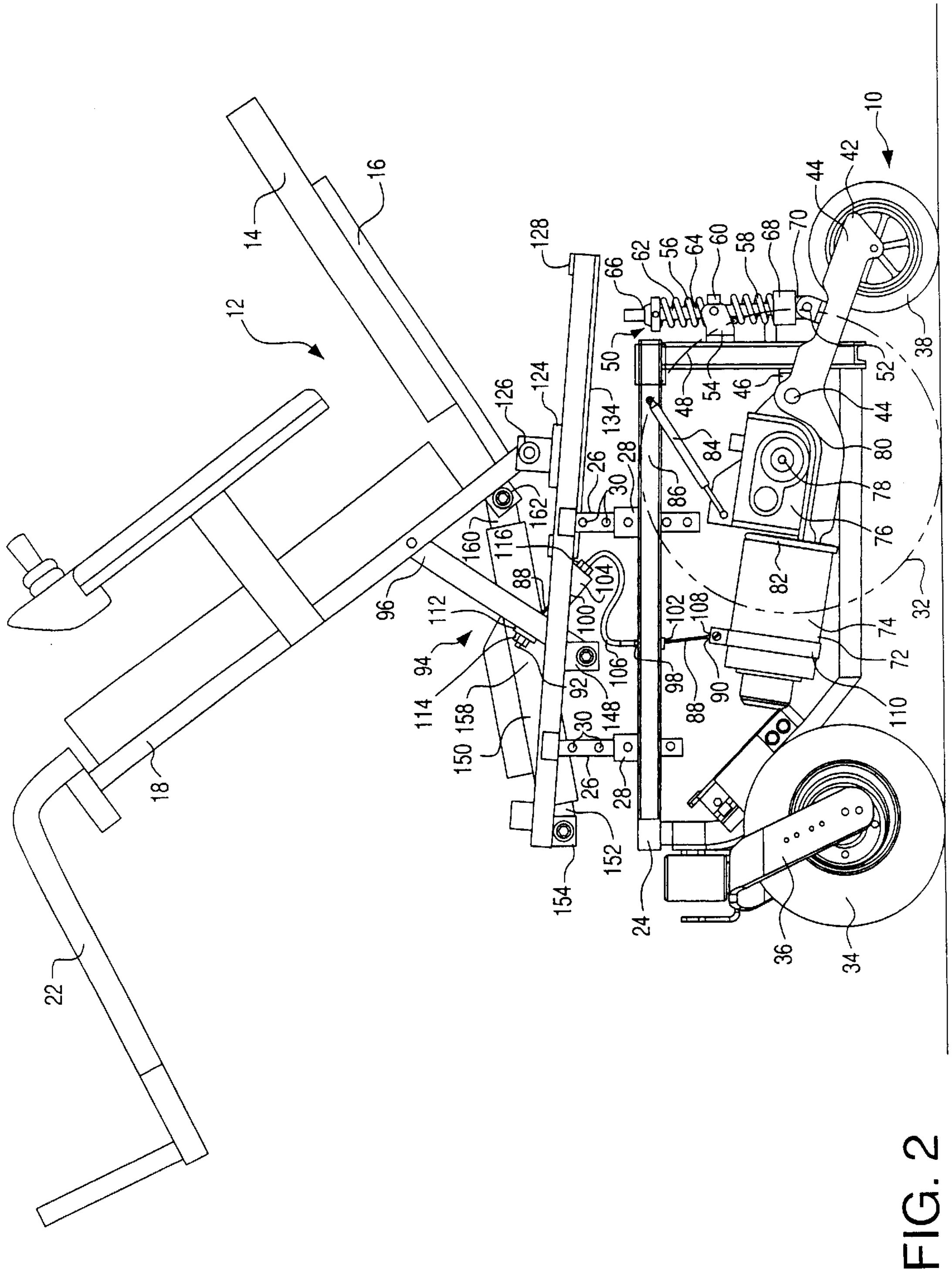
FIG. 2 is a left side view of the wheelchair of FIG. 1 showing the seat in a reclined position.
Figure 3:
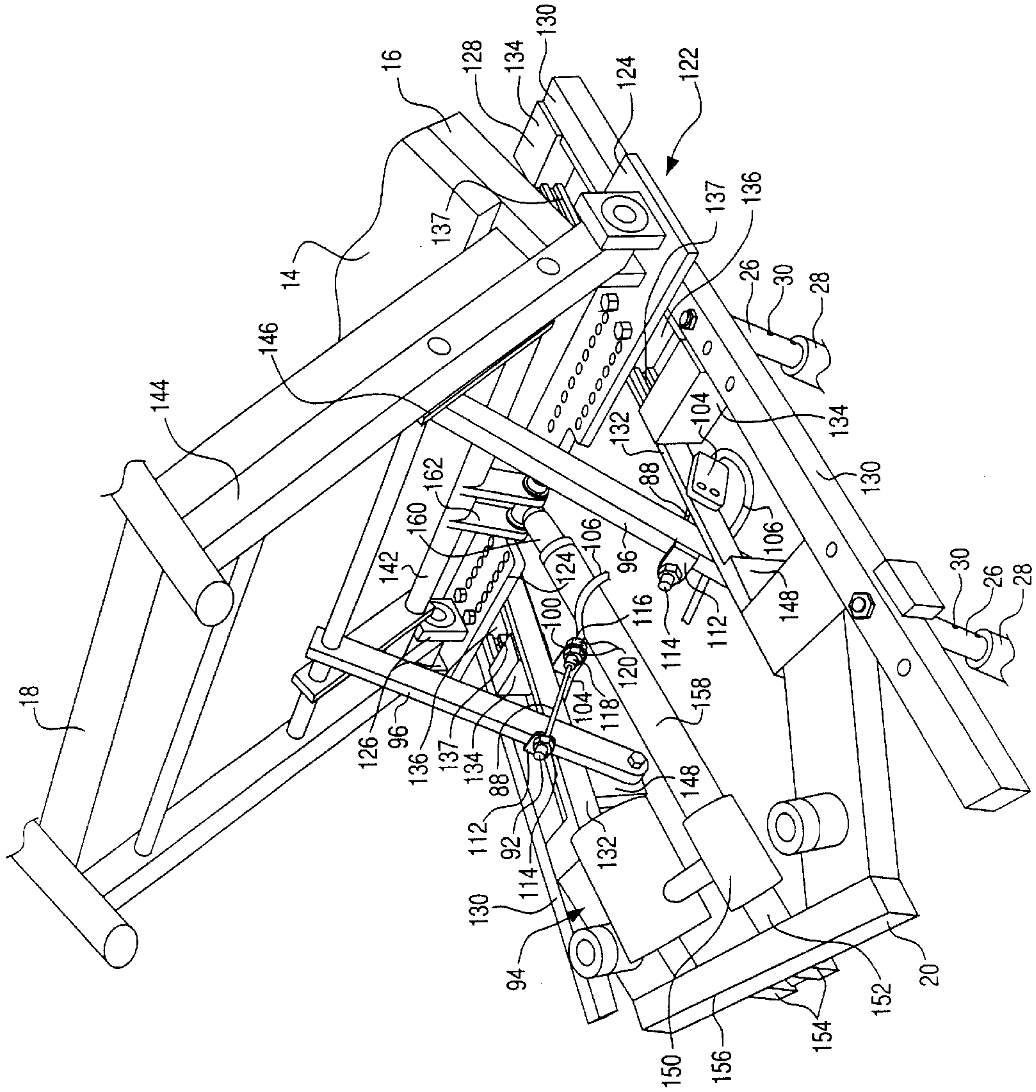
FIG. 3 is a partial perspective view of the wheelchair of FIG. 1 from the left side showing the seat pivoted with respect to the base.

Referring to the drawings where like numerals refer to like elements, there is shown in FIGS. 1–3 a first embodiment of a stabilizing system 10 according to the present invention incorporated in a motorized wheelchair 12. The wheelchair 12 includes a seat 14 having a back portion 16 and a bottom portion 18. As will be described in more detail below, the seat 14 is pivotably supported on a seat support frame 20. The pivotable support of the seat 14 on the seat support frame 20 provides for a reclined position for an occupant of the wheelchair 12. The wheelchair 12 is shown in FIG. 1 with the seat 14 in an unpivoted position suitable for transportation of an occupant. In FIG. 2, the seat 14 has been pivoted with respect to the base for a reclined position of an occupant. A footrest assembly 22 is secured to the bottom portion 18 of the seat 14 such that the footrest assembly 22 pivots with the seat 14 as shown in FIG. 2.

The seat support frame 20 is connected to a base 24 of the wheelchair 12 by legs 26 received in mounts 28 secured to the base 24. Each of the legs 26 includes holes 30 for receipt of a pin for removably securing the seat support frame 20 to the base 24. The inclusion of a plurality of holes 30 in each of the legs 26 provides for manual adjustability in the distance between the base 24 and a connected seat support frame 20.

The wheelchair 12 includes a pair of drive wheels 32 positioned rearwardly with respect to the base 24 and a pair of forwardly located caster wheels 34. The caster wheels 34 are rotatably connected to brackets (fork) 36 that are, in turn, connected to the base 24 for rotation about a vertical axis. The wheelchair 12 also includes at least one and, more preferably, a pair of anti-tip wheels 38 located rearwardly of the drive wheels 32. As shown in FIG. 1, the anti-tip wheels 38 are preferably normally not in contact with the ground surface on which the wheelchair 12 positioned. The anti-tip wheels 38 prevent overturning of wheelchair 12 that might occur from sudden acceleration of the wheelchair on a steep incline or overcoming an obstacle, such as a curb. As will be described in greater detail, the stabilizing system 10 connects the seat to the anti-tip wheels 38 such that the anti-tip wheels 38 approach the ground surface during pivoting (reclining) of the seat and preferably contact the ground surface when the seat is significantly reclined, see, for example, FIG. 2.

Each of the anti-tip wheels 38 is rotatably connected at opposite sides to rear arm portions 42 of an anti-tip member 40. Only the outer one of the rear arm portions 42 is shown in FIGS. 1 and 2. The inner one of the rear arm portions 42, on the opposite side of anti-tip wheel 38, however, would appear as a mirror image were it to be viewable from the right side of the wheelchair 12. Each anti-tip member 40 is pivotably connected at 44 to a bracket 46 which is secured to an elongated frame member 48 of the base 24.

The stabilizing system 10 further includes a pair of spring assemblies 50 pivotably connected to brackets 52 which are secured to the anti-tip members 40. Each of the spring assemblies 50 is also pivotably connected to a bracket 54 which is secured to the frame member 48 of the base 24. Each spring assembly 50 includes separate upper and lower springs 56 and 58, respectively, located on opposite sides of a central disk 60. The central disk 60 has a diameter that is sufficiently large to provide for compression of the springs 56, 58 in the manner to be described. The disk 60 is pivotably connected at opposite sides to bracket 54 secured to the base 24. Each spring assembly 50 further includes a spring actuator 62 having a central shaft portion 64 that is slidably received the springs 56, 58 and by the disk 60 through an opening in the disk. The spring actuator 62 further includes upper and lower end portions 66, 68, respectively, secured to opposite ends of the shaft portion 64. Most preferably, the upper end portion 66 is removably secured to the shaft portion 64 by a threaded connection (not shown). The lower end portion 68 includes an attachment tab 70 for pivotable connection of the spring actuator 62 to the bracket 52 of anti-tip member 40. The upper and lower end portions 66, 68 are sized to provide for compression of the upper and lower springs 56, 58, respectively, between the disk 60 and the upper and lower ends.

The separate springs 56, 58 in the spring assemblies 50 provide for dual functioning of the spring assemblies in the following manner depending on the direction in which the spring actuator 62 is driven. First, compression of the lower spring 58 caused by upward movement of the actuator 62 provides for a shock absorbing feature in the event of overturn of the wheelchair 12, as when the wheelchair accelerates on an incline for example. Without such a shock-absorbing feature, sudden contact between the anti-tip wheel 38 and the ground surface during the overturn could subject an occupant of the wheelchair to a jarring force, in the nature of a whiplash. Second, as will be described in greater detail, the stabilizing system 10 of the present invention permits pivoting of the anti-tip member 40 such that anti-tip wheel 38 will contact the ground surface when the seat 14 is pivoted to the fully reclined position shown in FIG. 2. This pivoting of the anti-tip member 40 compresses the upper spring 56 as the actuator 62 is driven downwardly. The compression of upper spring 56 generates a reaction force acting in opposition to the pivoting of the anti-tip member 40 urging upward return of the anti-tip wheel 38 from the ground surface when the seat 14 is pivoted back toward the base 24.

The motorized wheelchair 12 includes a pair of drive units 72 located on opposite sides of the wheelchair. Each of the drive units 72 engages one of the drive wheels 32 to provide propulsion for the wheelchair 12. The drive wheels 32 have been illustrated schematically in the Figures by a circular broken line to facilitate viewing of the stabilizing system 10. Each of the drive units 72 includes a motor 74 and a transmission 76 secured together such that they are substantially aligned with each other. The transmission 76 includes an output 78 to which the drive wheel 32 is engaged. The output 78 transfer torque to the drive wheels 32, thereby producing rotation. Only the left side drive unit 72 is shown in FIGS. 1 and 2. The right side drive unit 72 is similar in construction and would appear as a mirror image were the wheelchair 12 to be viewed from the right side. The motors 74 of the drive units 72 are powered by an on-board battery, not shown, in the manner well known in the art.

The drive wheels 32 are not directly connected to the base 24. Instead, an independent suspension system for the drive wheels 32 is provided in the following manner. Each of the anti-tip members 40 includes forward arm portions 80 on opposite sides of the drive units 72 (only the outer one being viewable in FIGS. 1 and 2). The forward arm portions 80 are secured to the motor 74 of the drive unit 72 by a clamp 82. Each drive unit 72 is also connected to the base 24 by a strut 84. The strut 84 has opposite ends pivotably connected to the transmission 76 and to an elongated frame member 86 of base 24. Connected in this manner, the drive units 72, drive wheels 32 and the anti-tip members 40 will pivot as assemblies with respect to the base 24. Since the drive wheels 32 are connected to the transmission outputs 78, the distance between the ground surface and the transmission outputs 78 remains constant. The independent suspension for the drive wheels 32 and the pivotal mounting of the drive units about pivot 44, permit a small amount of vertical shifting of the rearward end of the base 24 thereby allowing for pivoting of the anti-tip members 40 and drive units 72.

Independent suspension of the drive wheels 32 through a pivoting drive unit 72 is known, as disclosed in U.S. Pat. No. 6,129,165, incorporated herein by reference in its entirety. The wheelchair disclosed in the '165 patent is a mid-wheel drive wheelchair having drive wheels independently suspended through an assembly that includes a drive unit secured to a forward anti-tip member. Except for the connection of the assembly to the base forwardly of the drive unit, the basic principles involved are identical to the above-described independent suspension for the drive wheels 32 of wheelchair 12. Increased engine torque, were the wheelchair 12 to encounter an upward grade for example, would result in clockwise pivot of the drive unit 72 and anti-tip member 40 (in the left side view of FIG. 1) accompanied by a slight downward shift in the rearward end of the base 24. As a result, the distance between the ground surface and the anti-tip wheels 38 is beneficially reduced during those times when the chance of overturning of the wheelchair 12 is increased.

The stabilizing system 10 of wheelchair 12 utilizes the pivoting drive unit 72 of the drive wheel independent suspension to counter pivoting of the seat 14 during recline with pivoting of the anti-tip members 40. As shown in FIG. 2, the pivoting of the anti-tip member 40 produced by the stabilizing system 10 preferably moves the anti-tip wheels 38 into contact with the ground surface. Contact between the anti-tip wheels 38 and the ground surface prevents or inhibits any pivoting of the wheelchair with respect to the ground when the seat is in the reclined position shown.

The connection between the seat and the anti-tip wheel is as follows. An actuating cable 88 is connected at a first end 90 to the motor 74 of each of the drive units 72 and at an opposite second end 92 to a pivoting lift arm 96 of a seat lift assembly 94, to be described in greater detail below. Each actuating cable 88 is slidably received by the wheelchair 12 at first and second guide locations 98, 100. The first guide location 98 is provided at a bracket 102 secured to frame member 86 of base 24. Similarly, the second guide location 100 is provided by a bracket 104 secured to seat support frame 20. A sheath 106 extends between the first and second guide locations 98, 100 to provide a protective covering for the sliding actuating cable 88.

The operation of the actuating cable 88 is analogous to that of an actuating cable in a bicycle braking system in which a cable is slidably received by guide mounts associated with a lever and a caliper assembly, respectively. In a similar fashion, a translation of the second end 92 of the actuating cable 88 of wheelchair 12 with respect to the second guide location 100 results in a corresponding translation of first end 90 of the actuating cable 88 with respect to the first guide location 98.

The connection of each of the actuating cables 88 to the wheelchair 12 is preferably made in the following manner. An attachment member 108 having a central opening is secured to the first end 90 of the actuating cable 88. The attachment member 108 is pivotably connected to a belt clamp 110 secured to the motor 74 of the one of the drive units 72. A wide variety of components can be used to connect the cable to the motor. However, a connection which permits pivoting of the cable with respect to the motor is preferred since such a connection permits relative angular motion between the cable and the motor.

The connections for the second end 92 of the actuating cable 88 are shown most clearly in FIG. 3. A bracket 112 is secured to one of the lift arms 96 of the seat lift assembly 94 for translation of the actuating cable 88 when the lift arm 96 pivots with respect to the seat support frame 20. A stop 114, secured to the second end 92 of the cable 88, provides a bearing surface to react against the bracket 112 when the actuating cable is received in a notch (not shown) in the bracket 112. At each of the brackets 104 secured to the seat support frame 20, a slide mount 116 provides for sliding of an actuating cable 88 through the second guide locations 100. Each slide mount 116 includes an inner cylindrical portion 118 defining a central opening through which the actuating cable 88 is slidably received. As shown in FIG. 3, each slide mount 116 further includes a pair of spaced annular members 120 secured to the cylindrical portion 118. The spacing of the annular members 120 provides for receipt of the slide mounts 116 in notches (not shown) in brackets 104. When the lift arms 96 pivots with respect to the seat support frame 20 as shown in FIG. 2, the second ends of the actuating cables 88 are pulled through the slide mounts 116 at the second guide locations 100. Slide mounts (not shown) secured to brackets 102 of the base 24 provide for sliding of the actuating cables 88 through the first guide locations 98. Control cables such as the one described, are well know to those skilled in the art.

The pivoting of seat 14 is provided by lift assembly 94. The lift assembly 94 includes a seat slide assembly 122 which permits forward translation of the seat 14 with respect to the wheelchair 12 as the seat 14 is pivoted. The translation of the seat 14 during pivoting serves to limit rearward shifting of the center of a gravity for a reclining occupant which could produce loading on the base 24 that might lead to overturning of the wheelchair 12. Referring to FIG. 3, the seat slide assembly 122 includes a pair of seat plates 124 located at opposite sides of the wheelchair 12. Spaced supports 126 extend upwardly from each of the seat plates 124 for pivotable connection of the seat 14 preferably by a bolted connection. The slide assembly 122 further includes a pair of slide units 128 secured between frame members 130, 132 of seat support frame 20 beneath the seat plates 124. Each slide unit 128 includes a base portion 134 that is stationary with respect to the seat support frame 20 and a mount portion 136 that is movably supported by the base portion 134 for fore-and-aft translation with respect to the wheelchair 12. Each of the seat plates 124 is bolted to the mount portion 136 of one of the slide units 128 thereby permitting fore-and-aft movement of the seat 14 on the seat plates 124. Preferably the moving mount portion 136 is received in channels 137 formed in the stationary base portion 134. Rollers could also be incorporated on opposite sides of the mount portions 136 of the slide units 128 to facilitate translation of the mount portions 136 with respect to the base portions 134.

The seat lift assembly 94 further includes a sub-frame 138 connected to the bottom portion 18 of the seat 14. The sub-frame 138 includes forward and rearward crossbars 140, 142 each extending between frame members 144 of the seat bottom portion 18. The sub-frame 138 also includes a pair of struts 146 that connect the crossbars 140, 142 to each other. The struts 146, which can pivot with respect to the crossbars 140, 142, add stiffness to the sub-frame 138. Each of the lift arms 96 is pivotably connected at one end to forward crossbar 140 and at an opposite end to a downwardly extending portion 148 of the seat support frame 20.

The seat lift assembly 94 includes a seat drive 150 for powered translation of the seat 14 on the slide assembly 122. The seat drive 150 includes a base portion 152 pivotably connected to the seat support frame 20. The base portion 152 of the seat drive 150 is connected to mounts 154 extending downwardly from frame member 156 of the seat support frame 20. The seat drive 150 further includes a tubular portion 158 extending rearwardly from the base portion 152 and telescopically housing a shaft 160. The shaft 160 is pivotably connected to the center of the rear crossbar 142 by brackets 162 welded to the crossbar 142 and extending downwardly to the shaft 160. Forward translation of the seat 14 by shaft 160 of the seat drive 150 causes the lift arms 96 to pivot upwardly with respect to the seat support frame 20 thereby pivoting the seat 14 for recline of an occupant.

Figure 4:
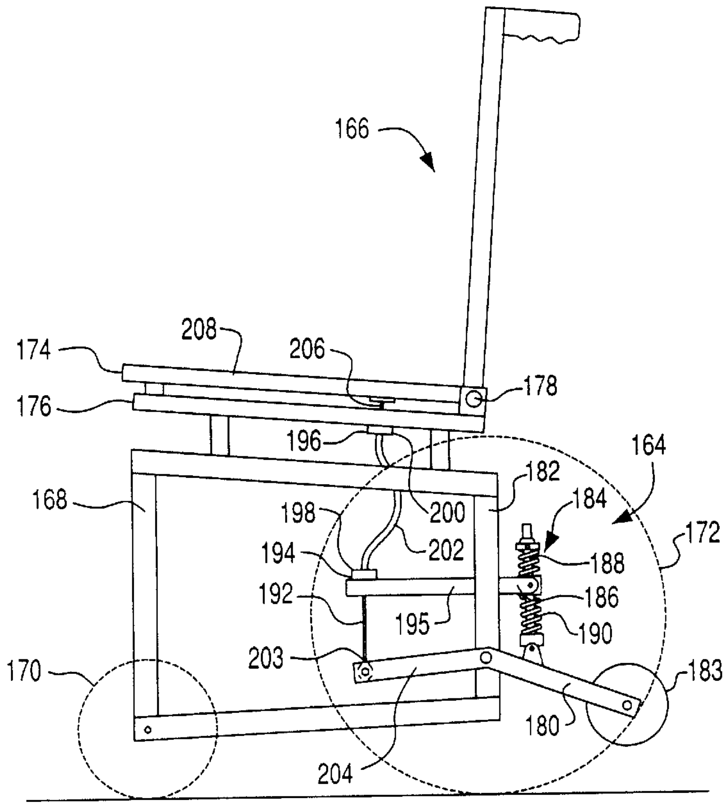
FIG. 4 is a left side view of a reclinable wheelchair having a stabilizing system according to a second embodiment of the present invention.
Figure 5:
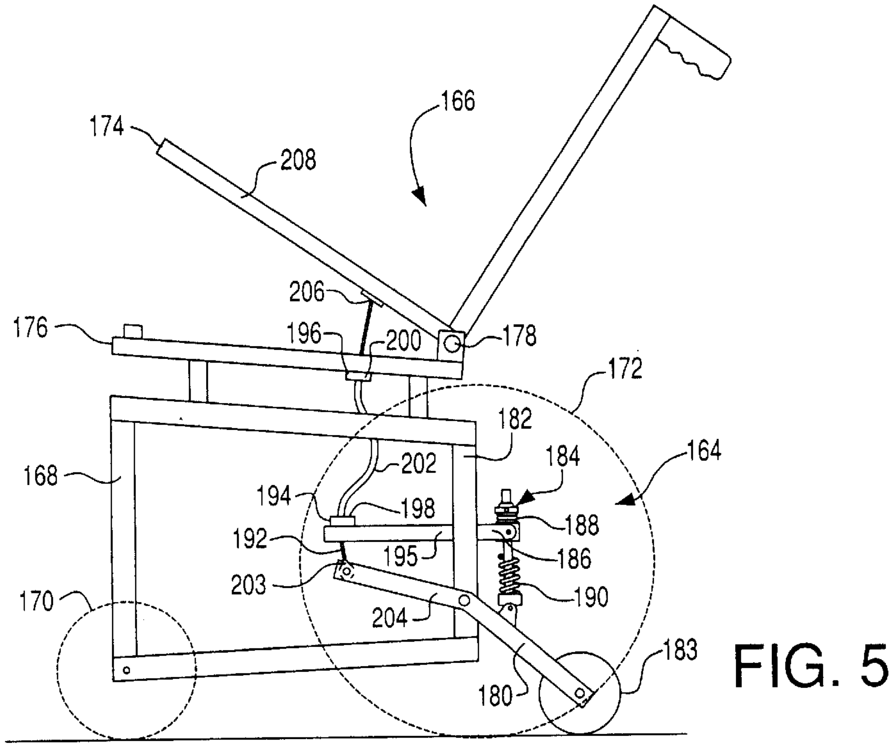
FIG. 5 is a left side view of the wheelchair of FIG. 4 showing the seat in a reclined position.

The incorporation of motor drive units of a powered wheelchair into the stabilizing system, as described above for the stabilizing system 10 of motorized wheelchair 12 of FIGS. 1–3, is not essential to the present invention. Furthermore, it is not required that the wheelchair be motor driven or that recline of the pivotable seat be provided by a powered lift assembly, as described for wheelchair 12. Referring to FIGS. 4 and 5, there is shown an alternate embodiment of a wheelchair 166 having a recline stabilizing system 164 according to the present invention. The wheelchair 166 includes a base 168 and front and rear wheels 170, 172 rotatably connected to the base 168. The wheelchair 166 could be configured for manual propulsion by engagement of a user's hands with the relatively larger rear wheels 172 or, alternatively, could be propelled by a motor drive (not shown). The wheelchair 166 further includes a seat 174 supported on the base 168 by a seat support frame 176. The seat 174 is pivotably connected to the seat support frame 176 for pivot of the seat about a seat pivot axis 178 to a reclined position shown in FIG. 5.

The stabilizing system 164 includes a pair of anti-tip members 180 pivotably connected at opposite sides of base 168 to frame members 182. Each of the anti-tip members 180 preferably supports a wheel 183. The stabilizing system 164 also includes spring assemblies 184 pivotably connected to the anti-tip members 180 and to brackets 186 secured to frame members 182. The spring assemblies 184 include upper and lower springs 188, 190. As described above for spring assemblies 50 of wheelchair 12, the spring assemblies 184 provide the dual function of absorbing shock during an overturn (compression of lower springs 190) and of return of the anti-tip member 180 when a reclined seat 174 is returned to the seat support frame 176 (compression of upper springs 188).

The stabilizing system 164 includes actuating cables 192 slidably received by the wheelchair 166 at first and second guide locations 194, 196. The first guide locations 194 are positioned on frame members 195 of the base 168. The second guide locations 196 are positioned on the seat support frame 176. In a similar fashion to wheelchair 12, the stabilizing system 164 includes brackets 198, 200 secured to the base 168 and seat support frame 176, respectively. A protective sheath 202 for each of the sliding cables 192 extends between the brackets 198, 200.

A first end 203 of each cable 192 is pivotably connected to a forward end 204 of the anti-tip members 180. A second end 206 of each cable 192 is connected to frame members 208 of the seat 174. Pivot of the seat 174 with respect to the base 168 results in translation of the second ends 206 of the cables 192 with respect to the second guide locations 196 and a corresponding translation of the first ends 203 of the cables with respect to the first guide locations 194.

The actuating cables 192 of the stabilizing system 164, therefore, directly connect the seat 174 to the anti-tip members 180. This is distinguished from the stabilizing system 10 shown in FIGS. 1–3 in which the intermediate elements of the lift arms 96 and drive units 72 of wheelchair 12 formed a part of the connection between the pivoting seat 14 and the anti-tip members 40.

In each of the stabilizing systems 10 and 164 of the wheelchairs 12 and 166 described above, the second end of the actuating cables 88 and 192 are connected to members that pivot with respect to the seat support frames 20 and 176 to provide the necessary translation of the cable with respect to the wheelchair. Any member associated with the seat that moves with respect to the seat support frame, however, is suitable for providing the required translation. The invention, therefore, is not limited to connection of the second end of an actuating cable to a pivoting member. It is conceivable, that the actuating cables could be secured to a non-pivoting member such as one of the sliding seat plates 124, for example, to provide for translation of the cable with respect to a slide guide mounted to the seat support frame at a guide location.

Referring to FIGS. 6 and 7, there is shown a stabilizing system 210 according to the present invention having pivot control mechanisms 212. Each pivot control mechanism 212 engages one of the actuating cables 214 of the stabilizing system 210 in the manner to be described for providing a predetermined amount of pivot of a wheelchair seat without a corresponding amount of pivot of a pair of anti-tip members 216. A stop 218, similar in construction to stop 114 secured to the second ends of the actuating cables 88 of FIGS. 1–3, is secured to a first end 220 of the actuating cables 214. Circular disk members 222 having central openings receive the actuating cables 214 such that the stops 218 bear against the disks 222.

Each of the pivot control mechanisms 212 includes a cylindrical housing 224 having opposite first and second end portions 226, 228 for containing the first end 220 of one of the cables 214 and one of the disks 222. The cables 214 are slidable with respect to the housings 224 through openings 230 in the second end portions 228. A tab 232 secured to the first end portions 226 of each of the housings 224 is pivotally connected to the anti-tip members 216.

The second ends (not shown) of actuating cables 214 are secured to moving elements associated with a pivoting seat of a wheelchair, such as the lift arms 96 of wheelchair 12 or frame members 208 of wheelchair 166, described above. The anti-tip members 216 of the stabilizing system 210 are pivotably connected to a wheelchair base, such as in the manner described previously for anti-tip members 180 of wheelchair 166.

Each of the pivot control mechanisms 212 also includes a spring 238 located within the housing 224 between the disk 222 and the second end portion 228. Translation of the actuating cable 214 with respect to the wheelchair as the seat pivots with respect to the base causes the disk 222 to translate within the housing 224 as shown in FIG. 7. The translation of the disk 222 compresses the spring 238 between the disk 222 and the second end portion 228 of housing 224. The translation of the first end 220 of cable 214 occurs without a corresponding translation of the end 236 of anti-tip member 216 connected to the housing 224. Following sufficient compression of the spring 238, resistance against movement of the anti-tip member 216, which is provided by a biasing spring assembly (not shown), such as spring assembly 50 of FIGS. 1–3, will be overcome. Once the compression of the spring overcomes the biasing force resisting movement of the anti-tip members 216, further translation of the cable 214 with respect to the wheelchair will result in translation of the end 236 of the anti-tip member 216 with respect to the wheelchair.

Figure 12:
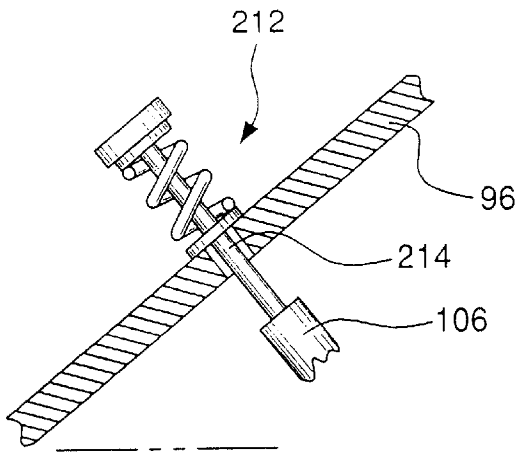
FIGS. 12 and 13 are side views of a portion of the wheelchair of FIG. 3 illustrating a pivot control mechanism in two different actuation positions.
Figure 13:
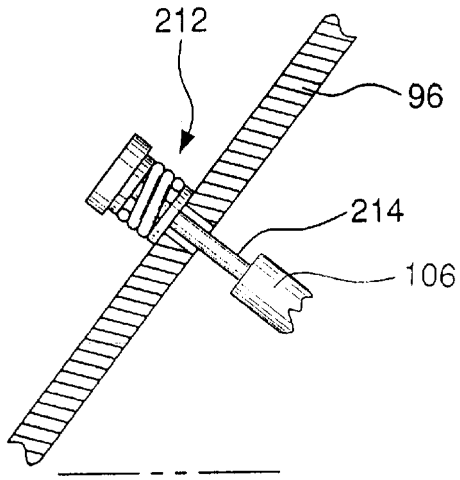

FIGS. 12 and 13 illustrate the location of the pivot control mechanism 212 in the embodiment of the invention illustrated in FIG. 3. In this configuration, the pivot control mechanism 212 does not include a housing. As shown, only after the lift arms move through an angle to the position in FIG. 13 and the spring in the pivot control mechanism is completely compressed, does further angular movement of the control arm (i.e. further tipping) produce a positional change in the anti-tip wheels. However, while the position of the anti-tip wheels may not change prior to the spring reaching the position shown in FIG. 13, the partial compression of the spring changes the amount of torque that is necessary for the anti-tip wheels are moved downward. Also, the pivot control mechanism 212 as illustrated in the figures is designed such that upward movement of the anti-tip wheels and movement of the motors due to torque is not inhibited.

Figure 8:
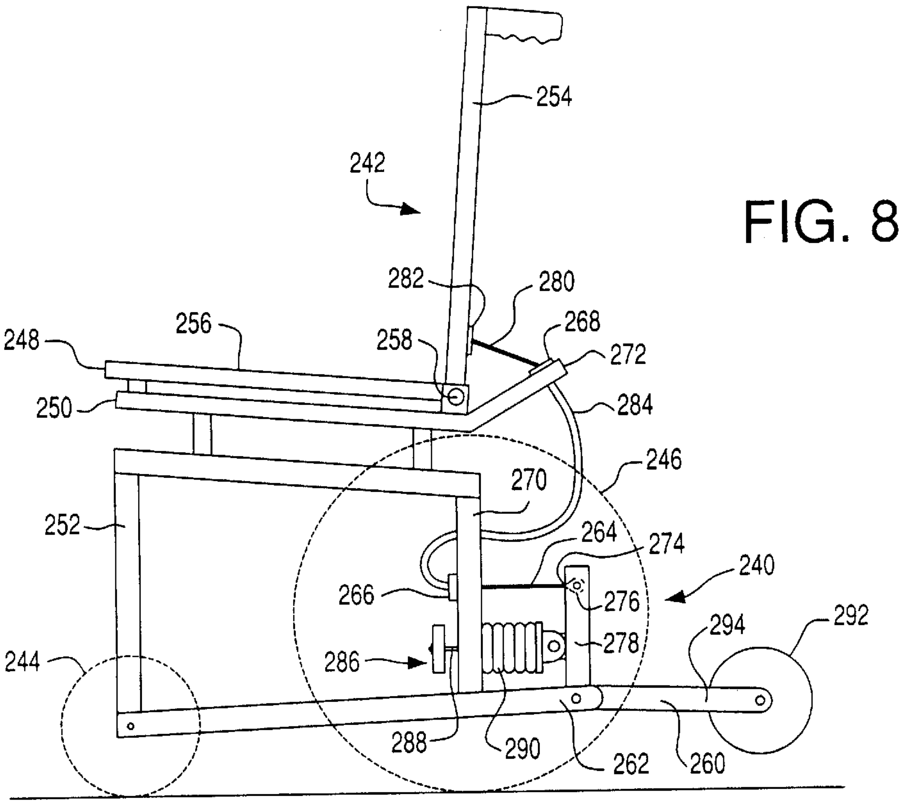
FIG. 8 is a left side view of a reclinable wheelchair having a stabilizing system according to a fourth embodiment of the present invention.
Figure 9:
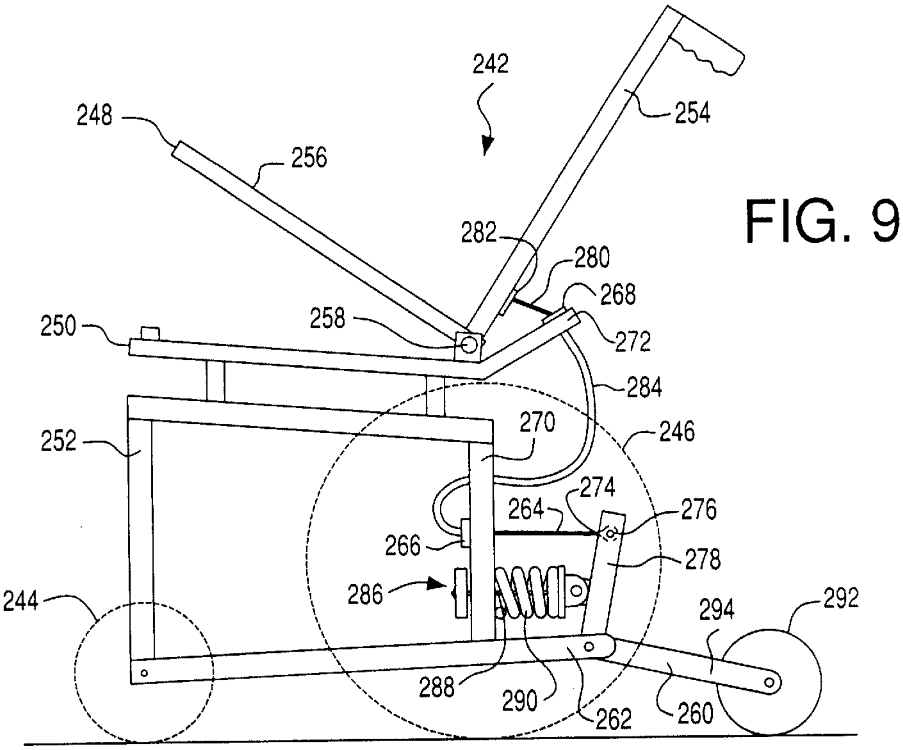
FIG. 9 is a left side view of the wheelchair of FIG. 8 showing the seat in a reclined position.

In the stabilizing systems described above, the actuating cables are connected to the bottom portion of the seats. It is not required, however, that the cables be connected to the bottom portion of the seat. Referring to FIGS. 8 and 9 there is shown a stabilizing system 240 for a wheelchair 242. The wheelchair 242 includes front and rear wheels 244 and 246. Similar to wheelchair 166 shown in FIGS. 4 and 5, the wheelchair 242 could be configured for manual propulsion or, alternatively, could be propelled by a motor drive (not shown).

The wheelchair 242 includes a seat 248 supported by a seat support frame 250 and a base 252 supporting the seat support frame 250. The seat 248 includes back and bottom portions 254, 256 and is pivotably connected to the seat support frame 250 at 258. The stabilizing system 240 includes anti-tip members 260 each pivotably connected to a base extension 262. An actuating cable 264 connects the anti-tip members 260 to the back portion 254 of the seat 248 for linking pivoting of the seat 248 with pivoting of the anti-tip members 260. In a similar manner to the actuating cables 88 of FIGS. 1–3, each of the actuating cables 264 is slidably received by the wheelchair 242 at first and second guide locations. The first and second guide locations are provided by brackets 266, 268 secured respectively to members 270 of base 252 and rearward extensions 272 of the seat support frame 250. A first end 274 of each of the cables 264, in a similar manner to cables 88, is secured to an attachment member 276 for pivotable connection to a first arm 278 of one of the anti-tip members 260. An opposite second end 280 of the cable 264 is connected to a bracket 282 secured to the back portion 254 of the seat 248. A sheath 284 extending between the brackets 266, 268 provides a protective covering for each of the cables 264.

The stabilizing system 240 includes spring assemblies 286 each having a drive rod 288 pivotably connected at an end to the first arm 278 of one of the anti-tip members 260. Each of the drive rods 288 is also pivotably connected to one of members 270 of base 252, preferably using a pivoting disk (not shown) in a similar fashion to the spring assemblies 50 of FIGS. 1 and 2. Each of the spring assemblies 286 also includes a spring 290 that is substantially compressed in the view shown in FIG. 8. The springs 290, therefore, impose a biasing force on the anti-tip members 260 to pivot the anti-tip members 260 into contact between the ground surface and wheels 292 connected to second arms 294 of anti-tip members 260.

As shown in FIG. 8, when the seat 248 is in its non-reclined position, the second ends 280 of the cables 264 have been translated away from the brackets 268 at the second guide locations. A corresponding translation of the opposite first ends 274 of the cables 264 towards the brackets 266 at the first guide locations holds the anti-tip members 260 in the position shown in FIG. 8 with the springs 290 in a compressed condition. Referring to FIG. 9, the seat 248 has been pivoted with respect to the seat support frame 250 about 258. The pivot of the seat 248 translates the brackets 282 securing the second ends 280 of the cables 264 towards the brackets 268 at the second guide locations. This translation releases the opposite first ends 274 of the cables 264 for a corresponding translation of first ends 274 of the cables 264 and pivoting of the anti-tip members 260 under the biasing force of springs 290.

Although the springs 290 are shown in a substantially compressed condition in FIG. 8, they need not be fully compressed. A slight amount of remaining compressibility of spring 290 provides for a beneficial shock absorbing feature limiting jolting forces applied to an occupant in the event of acceleration overturn of the wheelchair.

Figure 10:
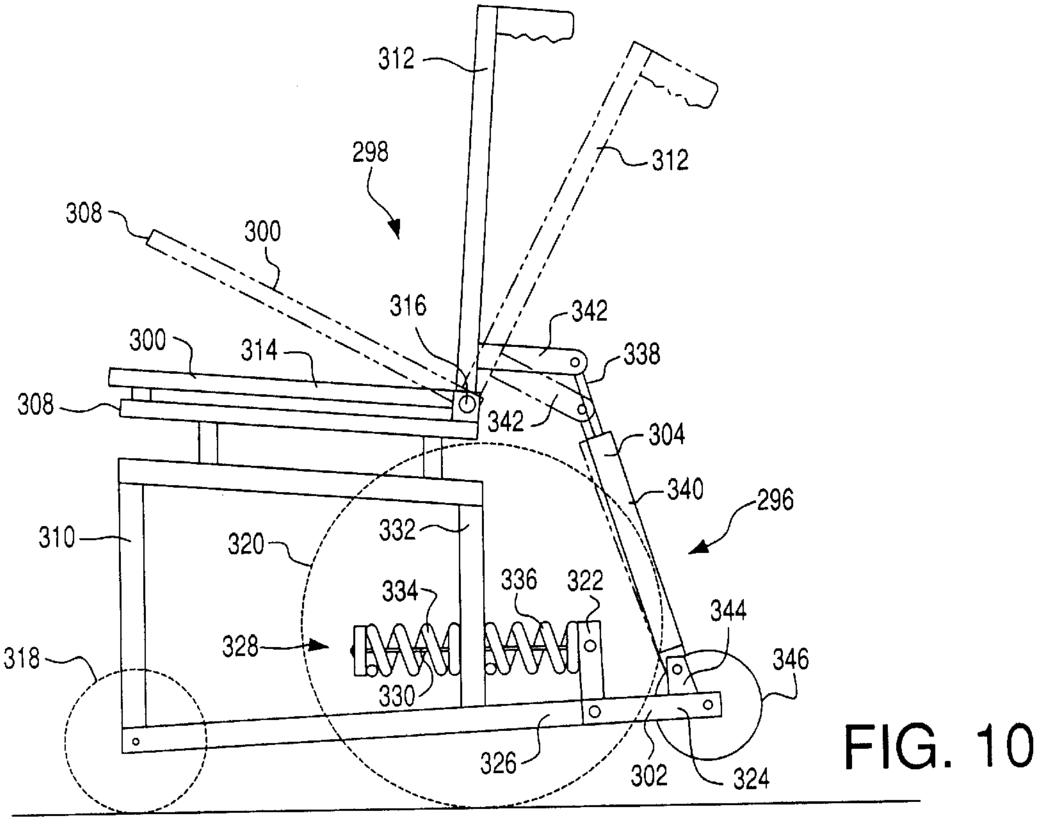
FIG. 10 is a left side view of a reclinable wheelchair having a stabilizing system according to a fifth embodiment of the present invention.
Figure 11:
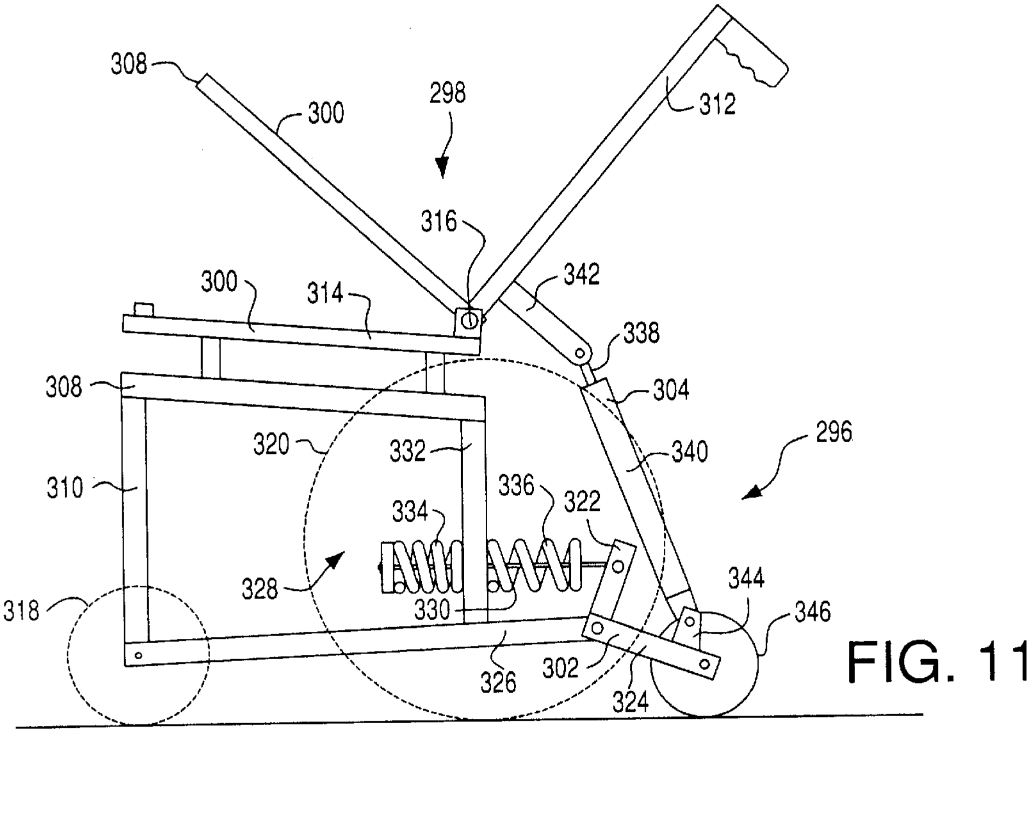
FIG. 11 is a left side view of the wheelchair of FIG. 10 showing the seat in a reclined position.

In each of the stabilizing systems of FIGS. 1–9, the connection between the pivoting seat and a pair of anti-tip members includes an actuating cable. Referring to FIGS. 10 and 11, there is shown a stabilizing system 296 for a wheelchair 298 in which the connection between a pivoting seat 300 and a pair of anti-tip members 302 is provided by link members 304. In the manner to be described, the stabilizing system 296 provides for a controlled pivot of the anti-tip members 302 in which a predetermined amount of seat pivot will occur without a corresponding pivot of the anti-tip members 302.

The seat 300 of the wheelchair 298 is supported by a seat support frame 308 and a base 310. The seat 300 includes back and bottom portions 312, 314 and is pivotably connected to the seat support frame 308 at 316. The wheelchair 298 includes front and rear wheels 318 and 320. Similar to wheelchair 166 shown in FIGS. 4 and 5, the wheelchair 298 could be configured for manual propulsion by engagement of a user's hands with the relatively larger rear wheels 320 or, alternatively, could be propelled by a motor drive (not shown).

Each of the anti-tip members 302 includes first and second arms 322, 324 and are pivotably connected to a rearward extension 326 of base 310. The stabilizing system 296 further includes a pair of spring assemblies 328 connected to the anti-tip members 302 and to the base 310. Each of the spring assemblies 328, similar to spring assemblies 50 of FIGS. 1 and 2, includes an actuating rod 330 pivotably connected at an end to the first arm 322 of one of the anti-tip members 302. The actuating rods 330 are pivotably and slidably connected to frame members 332 of base 310, by bracket supported disk members (not shown) in a similar fashion to the spring assemblies 50 of FIGS. 1 and 2 for example. Each spring assembly 328 includes first and second springs 334, 336 positioned on opposite sides of the frame members 332.

Each of the link members 304 is preferably a strut having a first portion 338 slidably and telescopically received by a second portion 340 to provide for compressibility of the link member 304. The first portion 338 is pivotably connected to a frame extension 342 secured to back portion 312 of seat 300. The second portion 340 is pivotably connected to a bracket 344 secured to the second arm 324 of one of the anti-tip members 302 adjacent a wheel 346.

The stabilizing system 296 provides for control over pivoting of the anti-tip members 302 in the following manner. The spring assemblies 328 provide for shock absorption during acceleration overturn (compression of second springs 336). The spring assemblies 328 also function to restrain pivoting of the anti-tip members 302 during the initial pivoting of seat 300 (compression of first springs 334) so that the link members 304 may be axially compressed. Following the compression of the link members 304, further pivoting of the seat 300 will result in concomitant pivoting of the anti-tip members 302 as shown in FIG. 9.

The wheelchair of the present invention may be designed such that upon tipping of the seat, the speed of the wheelchair is limited. It is further envisioned that complete operability of the wheelchair may be prevented when the tilt of the seat is beyond a certain angle.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the recitation of the appended claims.

What is claimed is:

1. A stabilizing system for a wheelchair having a base and a seat, the seat being pivotable with respect to the base, the stabilizing system comprising:

at least one anti-tip member pivotably connected to the base about a pivot axis; and an anti-tip actuating cable operably connected to the seat and the anti-tip member such that pivoting of the seat causes the cable to pivot the anti-tip member.

2. The stabilizing system according to claim 1 wherein the anti-tip actuating cable is slidably received by the wheelchair at first and second guide locations.

3. The stabilizing system according to claim 2, further comprising a seat support frame connected to the base and wherein the first and second guide locations are provided by first and second members secured, respectively, to the base and seat support frame.

4. The stabilizing system according to claim 1, wherein the seat comprises a back portion and a bottom portion and wherein the wheelchair further comprises a lift assembly engaging the bottom portion of the seat for pivoting the seat with respect to the base, the lift assembly including at least one arm having opposite ends pivotably connected to the bottom portion of the seat and to the base, an end of the anti-tip actuating cable being attached to the arm of the lift assembly.

5. The stabilizing system according to claim 1, wherein the anti-tip member comprises a first portion that extends forwardly with respect to the pivot axis and a second portion that extends rearwardly with respect to the pivot axis, and wherein the anti-tip actuating cable is secured to the first portion of the anti-tip member.

6. The stabilizing system according to claim 1, further comprising a wheel rotatably connected to the anti-tip member adjacent an end of the anti-tip member.

7. The stabilizing system according to claim 1, wherein the seat comprises a back portion and a bottom portion and wherein the anti-tip actuating cable is operably connected to the bottom portion.

8. The stabilizing system according to claim 1, wherein the seat comprises a back portion and a bottom portion and wherein the anti-tip actuating cable is operably connected to the back portion.

9. The stabilizing system according to claim 8 wherein the seat is pivotably connected to a seat support frame supported by the base and wherein the actuating cable is slidably received a rearward extension of the seat support frame.

10. A powered wheelchair comprising:

a base including a pair of drive wheels;

at least one drive motor engaging one of the drive wheels;

an anti-tip member secured to the drive motor to form therewith a suspension assembly connected to the base for pivot about an axis, the drive motor located forwardly with respect to the axis, at least a portion of the anti-tip member extending rearwardly with respect to the axis;

a seat having a back portion and a bottom portion, the seat pivotably supported by the base; and an actuating cable slidably received by the base in at least one location, the actuating cable having a first end connected to the suspension assembly forwardly of the axis, and a second end operably connected to the bottom portion of the seat such that pivoting of the seat causes the actuating cable to pivot the suspension assembly about the axis.

11. The wheelchair according to claim 10, further comprising a recline assembly engaging the bottom portion of the seat for pivoting the seat with respect to the base, the recline assembly including at least one lift arm pivotably connected to the bottom portion of the seat and to the base, and wherein the second end of the actuating cable is secured to the lift arm.

12. The wheelchair according to claim 11, wherein the seat is translatable with respect to the base and wherein the recline assembly further comprises a drive member engaging the seat for powered translation of the seat with respect to the base and pivoting of the lift arm.

13. The wheelchair according to claim 10, further comprising a return spring engaging the base and the suspension assembly for biasing the suspension assembly in a direction that is opposite the direction of pivot caused by pivoting of the seat with respect to the base.

14. A stabilizing system for a wheelchair having a base and a seat, the seat being pivotable with respect to the base, the stabilizing system comprising:

at least one anti-tip member pivotably supported by the base;

an anti-tip actuating cable operably connected to the seat and the anti-tip member such that pivoting of the seat causes the cable to pivot the anti-tip member; and an anti-tip control mechanism comprising an axially compressible spring, the actuating cable operably engaging the spring of the control mechanism such that pivot of the seat with respect to the base causes the actuating cable to compress the spring without pivoting the anti-tip member.

15. The stabilizing system according to claim 14, wherein the anti-tip control mechanism further comprises a spring retainer secured to the anti-tip member, the spring being positioned between the anti-tip member and an end portion of the retainer opposite the anti-tip member.

16. The stabilizing system according to claim 15, further comprising a wheel rotatably connected to the anti-tip member adjacent an end of the anti-tip member.

17. A reclinable wheelchair comprising:

a base;

a seat pivotably supported on the base, the seat including a back portion;

at least one anti-tip member pivotably connected to the base;

a link member having a first end pivotably connected the back portion of the seat and a second end pivotably connected to the anti-tip member for transferring pivoting of the seat to pivoting of the anti-tip member, the link member being axially compressible to provide for a predetermined amount of pivot of the seat without corresponding pivot of the anti-tip member.

18. The reclinable wheelchair according to claim 17 wherein the link member comprises a strut having a first portion that is slidably and telescopically received by a second portion.

19. The reclinable wheelchair according to claim 17 further comprising a biasing assembly including an actuating rod pivotably connected to the anti-tip member and to the base, the biasing assembly further including at least one spring slidably receiving the actuating rod.

20. The reclinable wheelchair according to claim 17, further comprising a wheel rotatably connected to the anti-tip member adjacent an end of the anti-tip member.

* * * * *